United States Patent [19]
Hollins

[11] 3,828,994
[45] Aug. 13, 1974

[54] APPARATUS FOR TRANSPORTING ARTICLES IN THE SPACE ABOVE THE OUTBOARD PASSENGER PORTION OF THE FRONT SEAT OF A MOTOR VEHICLE

[76] Inventor: Jesse R. Hollins, 40 Stoner Ave., New York, N.Y. 11021

[22] Filed: Aug. 7, 1973

[21] Appl. No.: 386,376

[52] U.S. Cl.. 224/42.46 B, 224/42.42 A, 224/29 D, 297/254, 297/255, 108/44
[51] Int. Cl............................................. B60r 27/00
[58] Field of Search..... 224/29 R, 42.45 B, 42.46 B, 224/42.42 A, 29 D; 297/254, 255, 256; 108/44, 149

[56] References Cited
UNITED STATES PATENTS

| | | | |
|---|---|---|---|
| 1,140,730 | 5/1915 | Wolfert | 297/256 |
| 1,742,822 | 1/1930 | Olson | 224/42.42 A |
| 3,014,759 | 12/1961 | Bing | 224/29 D |

Primary Examiner—Robert J. Spar
Assistant Examiner—Kenneth Noland

[57] ABSTRACT

A platform includes a rear portion which extends slightly into the crevice between the front seat and the front seat back at the outboard passenger portion of the front seat and front seat back. A strap is provided and is looped about the passenger head restraint and maintains all but the rear portion of the platform above the front seat so that articles such as packages can be placed thereon without in any way affecting the motor vehicle ignition starter interlock system and seat belt warning system.

8 Claims, 4 Drawing Figures

PATENTED AUG 13 1974

APPARATUS FOR TRANSPORTING ARTICLES IN THE SPACE ABOVE THE OUTBOARD PASSENGER PORTION OF THE FRONT SEAT OF A MOTOR VEHICLE

BACKGROUND OF THE INVENTION

1. Field of the Invention

Package carrier for outboard portion of the front seat of a motor vehicle.

2. Brief Description of the Prior Art

In 1972/73 all passenger motor vehicles were equipped with, inter alia, seat belt assemblies for both the driver and the outboard passenger on the front seat. Each seat belt assembly included a fixed belt and an extendable belt with buckle members being provided for each belt. To ensure that use was made of the aforesaid seat belt assemblies, an audio-visual warning device was standard equipment on the motor vehicle. The audio-visual warning device was activated if the extendable seat belt of the driver seat belt assembly were not extended when the ignition switch movable arm was at the ignition "on" position and the gear shift member in a position so that the motor vehicle moved in a forward direction. The audio-visual warning device was also activated if the extendable seat belt of the outboard passenger seat belt assembly were not extended when a passenger was sitting on the outboard passenger portion of the front seat and the ignition switch movable arm was at the ignition "on" position and the gear shift member in a position so that the motor vehicle moved in a forward direction.

A load sensitive, normally open momentary switch was placed on the outboard passenger portion of the front seat of the motor vehicle and was closed by a passenger sitting on said outboard passenger portion of the front seat of the motor vehicle. If the load sensitive, normally open momentary switch were not closed, the audio-visual warning device was not activated if the extendable seat belt of the outboard passenger front seat belt assembly were not extended with the ignition switch movable arm at the ignition "on" position and the gear shift member in a position so that the motor vehicle moved in a forward direction. Thus it can be seen that the load sensitive, normally open momentary switch was intended to sense the presence of an outboard passenger on the front seat of a motor vehicle.

As a means of ensuring that the driver and outboard passenger use their seat belt assemblies, 1974 passenger motor vehicles will include an ignition starter interlock system. The ignition starter interlock system provides that the ignition starting circuit is not complete unless the extendable seat belt of the driver seat belt assembly is extended and the extendable seat belt of the front seat outboard passenger seat belt assembly is extended if a passenger is sitting on the outboard passenger portion of the front seat. In order to prevent continuous buckling of the front seat outboard passenger seat belt assembly a sequential switch arrangement is provided. The extendable seat belt of the front seat outboard passenger seat belt assembly must be extended after the load sensitive, momentary switch in the front seat is closed by the weight of the passenger for the ignition starting circuit to be closed so that the vehicle can be started. The extendable belt of the driver seat belt assembly must be extended each time the driver wishes to start the car.

The operators of motor vehicles very frequently place grocery packages and other articles on the outboard passenger portion of the front seat as a matter of convenience. However, with a 1974 motor vehicle this will prevent the motor vehicle from being started since the load on the outboard passenger portion of the front seat will maintain the load sensitive, momentary switch closed and the extendable seat belt of the outboard passenger seat belt assembly will not be extended. Maintaining the seat belt assembly for the front seat outboard passenger portion buckled continuously will not solve the problem in view of the sequential switch arrangement associated therewith.

SUMMARY OF THE INVENTION

Purpose of the Invention

It is an object of the present invention to provide a package carrier so that packages and other items can be stored and transported in the space above the outboard passenger portion of a motor vehicle front seat without in any way operating any switches in the outboard passenger portion of the front seat.

Still another object of the present invention is to provide a package carrier for a motor vehicle having an ignition starter interlock system wherein said package carrier can be used for transporting packages and other items in the space above the outboard passenger portion of the front seat of the motor vehicle without affecting operation of the ignition starter interlock system.

Still another object of the present invention is to provide a package carrier for use on a motor vehicle having an ignition starter interlock system wherein said package carrier can be used to transport packages and other itmes in the space above the outboard passenger portion of a motor vehicle front seat and wherein said package carrier can be used with different sizes and shapes of motor vehicle seats.

A further object of the present invention is to provide a package carrier capable of achieving the above and other objects and which can be economically manufactured and is reliable in operation.

Other objects of the present invention in part will be obvious and in part will be pointed out hereinafter.

Brief Description of the Invention

According to the present invention the foregoing as well as other objects are accomplished by a package carrier which consists of a platform. The platform includes first and second edges which are spaced from each other. In addition, the platform includes a tail section which rises slightly upwardly from the rear thereof and a forward curved section which curves slightly downwardly from the forward section thereof.

A first slot extends through said platform adjacent said first edge and said curved section. A second slot extends through said platform adjacent said second edge and said curved section and said first and second slots are identical in configuration as well as being in registry with each other.

A non-elastic normally limp strap is provided and includes a buckle so that the length of the loop formed by said strap can be adjusted. The strap is threaded through the first slot and the second slot with a portion of said strap being beneath the bottom of said platform.

In use, the platform tail is inserted in the crevice between the outboard passenger portion of the front seat back and the outboard passenger portion of the front seat. The strap is placed abut the passenger head restraint and the strap loop size is adjusted by means of the buckle so that the platform is at an incline with only the rear of the platform contacting the passenger seat. The forward portion of the platform is raised above the outboard passenger side of the front seat. Accordingly, packages and other items can be placed on the platform without in any way affecting the ignition starter interlock system and the audio-visual warning system.

The invention accordingly consists in the features of construction, combination of elements, and arrangement of parts which will be exemplified in the apparatus for transporting articles in the space above the passenger side of the front seat of a motor vehicle hereinafter described and of which the scope of application will be indicated in the appended claims.

BRIEF DESCRIPTION OF THE DRAWINGS

In the drawings wherein like parts in the different Figures are represented by the same reference numeral.

DESCRIPTION OF THE PREFERRED EMBODIMENTS

Figure 1:
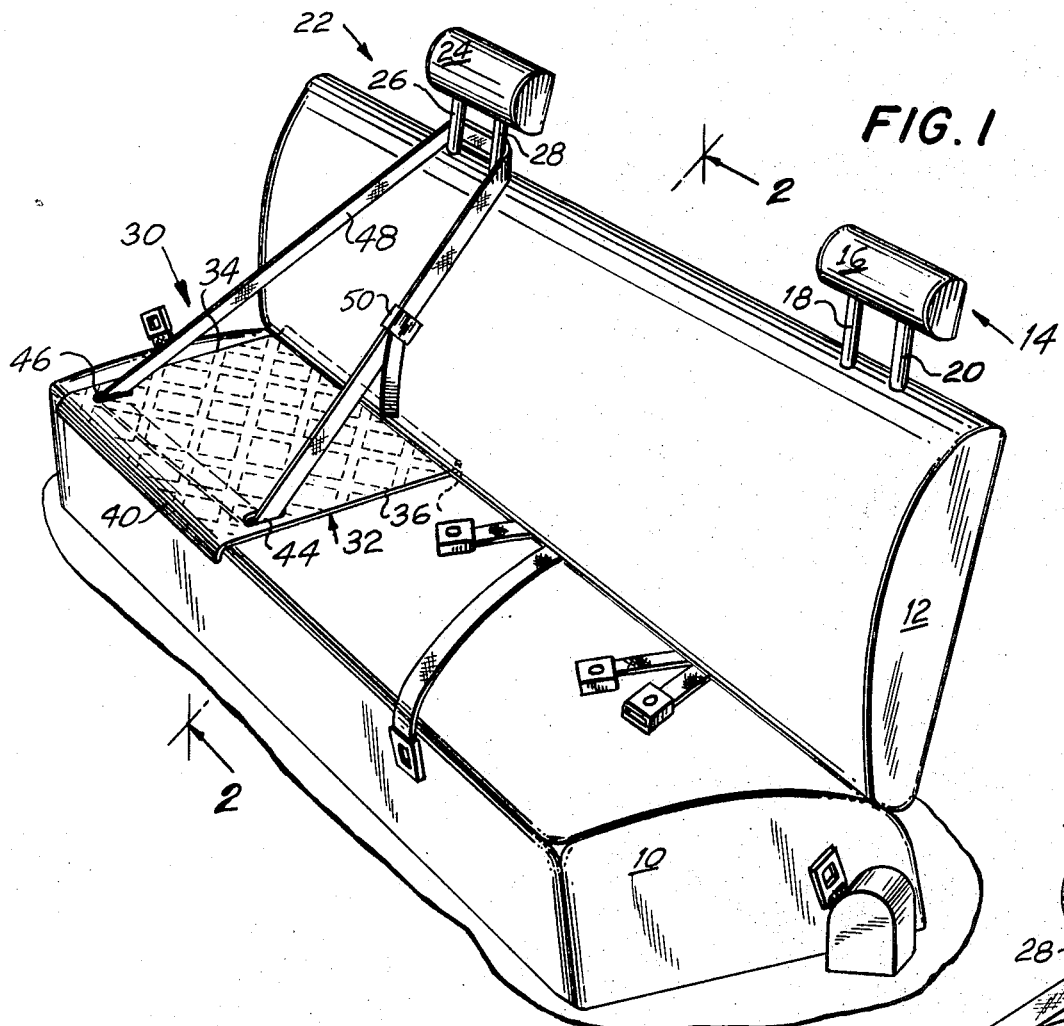
FIG. 1 is a perspective view of a package carrier used on a motor vehicle front seat in accordance with the present invention.
Figure 2:
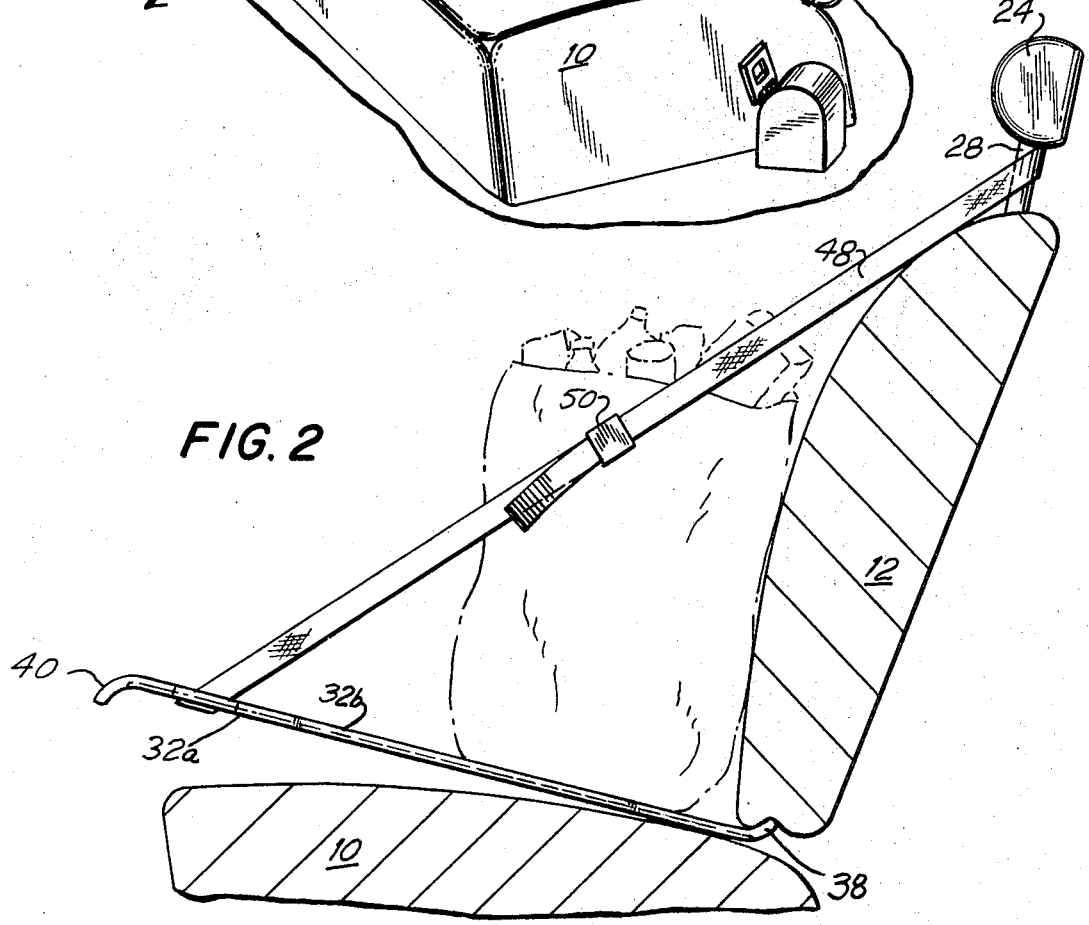
FIG. 2 is a sectional view taken substantially along the line 2—2 of FIG. 1.
Figure 3:
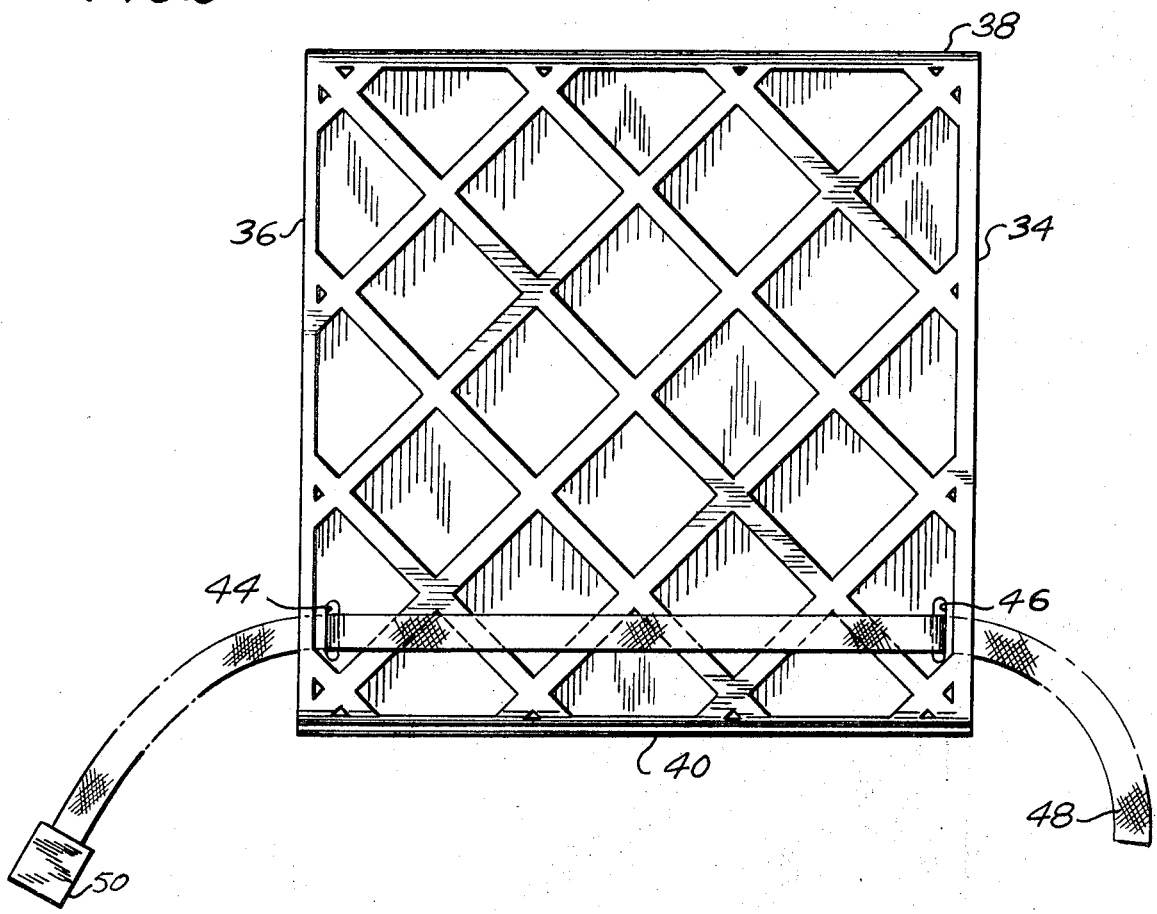
FIG. 3 is a bottom plan view of the platform of the package carrier of the present invention.

In FIG. 1 of the drawings a front seat 10 and a front seat back 12 of a passenger motor vehicle are shown. It is to be appreciated that the motor vehicle includes an ignition starter interlock system so that the motor vehicle cannot be started unless the extendable seat belt of the driver seat belt assembly is extended each time it is desired to start the motor vehicle. A normally open load sensitive switch is in the outboard passenger portion of the front seat. If the outboard passenger portion of the front seat is loaded (e.g., by an occupant or by package weight) the motor vehicle cannot be started unless the load sensitive switch is closed before the extendable seat belt of the outboard front seat passenger seat belt assembly is extended after the occupant is seated or the packages are placed on the seat. This ensures that an outboard passenger will first sit on the front seat and then extend the extendable seat belt of the outboard passenger front seat belt assembly. This prevents a person from keeping the seat belt of the outboard passenger front seat belt assembly permanently extended. Thus if a package were placed on the outboard passenger portion of the front seat the driver would have to extend the extendable seat belt of the outboard passenger front seat belt assembly in order to start the motor vehicle. In addition, the driver would have to extend the extendable belt of the driver seat belt assembly in proper sequence to make starting of the engine possible.

A head restraint 14 is provided for the driver. Head restraint 14 includes a padded cushion 16 which is secured to rods 18 and 20. Rods 18 and 20 are secured in the conventional manner to seat back 12 on the driver side and can be adjusted as will be apparent to those skilled in the art. A head restraint 22 is provided for the passenger sitting on the outboard passenger portion of the front seat and includes a padded cushion 24. Padded cushion 24 is secured to rods 26 and 28 which are secured to the passenger side of seat back 12 in the conventional manner. Rods 26 and 28 can be elevated as desired so that padded cushion 24 can be placed in a selected position.

A substantially rectangular package carrier 30 of the present invention includes a platform 32. Platform 32 is substantially flat and includes parallel edges 34 and 36. Platform 32 includes an upwardly curved tail 38 at the rear portion thereof. A curved section 40 extends downwardly from the forward portion of platform 32 for a short distance. It is to be appreciated that the distance between tail 38 and curved section 40 is equal to or slightly greater than the depth of seat 10.

A plurality of criss-crossing reinforcing ribs are located on bottom surface 32a of platform 32 and serve to strengthen said platform in the conventional manner. While a configuration of the reinforcing ribs has been shown in the drawings and described in the specification, it is to be appreciated that this is for illustrative purposes only and the means of reinforcing platform 32 can vary from that shown in the drawings and described herein without in any way departing from the spirit or scope of the present invention.

A first elongated slot 44 is located adjacent edge 36 and adjacent curved section 40. A second elongated slot 46 is identical to first elongated slot 44 and is located adjacent edge 34 and curved section 40. Slots 44 and 46 are in registry with each other.

A limp, non-elastic strap 48 is provided and extends through slots 46 and 48 so that a portion thereof is adjacent bottom surface 32a of platform 32. Strap 48 can be made from any limp material, such as fabric, leather, cord, rope and others that are substantially non-elastic, which will be apparent to those having ordinary skill in the art. A conventional buckle 50 or other adjusting means is provided and one end of strap 48 is secured thereto and a portion of said strap is threaded therethrough.

In use, platform 32 is positioned so that tail 38 extends into the crevice between seat 10 and seat back 12 at the outboard passenger portion of said seat and extends slightly into the seat back. Strap 48 is placed about head rest 22 and, specifically, rods 26 and 28 thereof. Buckle 50 or other adjusting means is used to adjust the length of the closed loop formed by strap 48 so that platform 32 defines an included acute angle with a plane passing through the rear thereof. Platform 32, except for the rear thereof, is elevated above the outboard passenger side of front seat 10 so as not to operate any switch in the outboard passenger side of the front seat. For a switch in the outboard passenger portion of the front seat to be affected, the central part of the outboard portion of the front seat must be depressed. Packages and other items can be placed on the platform without in any way depressing the front seat and affecting the functioning of the load sensitive switch in the outboard passenger side of front seat 10 and the operation of the ignition starter interlock system. Thus, the space above the outboard passenger portion of front seat 10 can be used for transporting packages and other items as desired without putting any weight on the outboard passenger portion of the front seat and without affecting the operation of any switches contained therein.

If it is desired to have a person sit on the outboard passenger portion of front seat 10, platform 30 swings 180 degrees to hang adjacent the rear of seat back 10 with strap 48 looped about rods 26 and 28.

Tail 38 by extending into the crevice between seat back 12 and seat 10 prevents lateral movement of platform 40 and braces a portion of said platform.

For those motor vehicles which have head rest padded cushions that extend to the upper portion of the seat back, strap 48 can be placed about said padded cushion. On those motor vehicles which have a head rest which extends upwardly from the motor vehicle passenger seat back and are slightly narrower than said motor vehicle passenger seat back, strap 48 can be looped about the narrow head rest portion of the passenger seat back. As a point of interest, strap 48 can be looped about any projection which extends upwardly from the outboard passenger portion of the seat back and defines opposed shoulders with the passenger seat back.

Preferably, platform 32 is made from a plastic material which can be injection molded and produced in large volumes.

If desired, the platform can be made from a metal material, paperboard, plywood and any other material which is sufficiently rigid to support packages. Depending on the material that is used, different manufacturing techniques will be utilized.

The package carrier of the present invention can be used on any passenger motor vehicle which has a load sensitive switch in the outboard passenger portion of the front seat.

Straps 48 prevent a package on platform 32 from falling off the platform sides.

Figure 4:
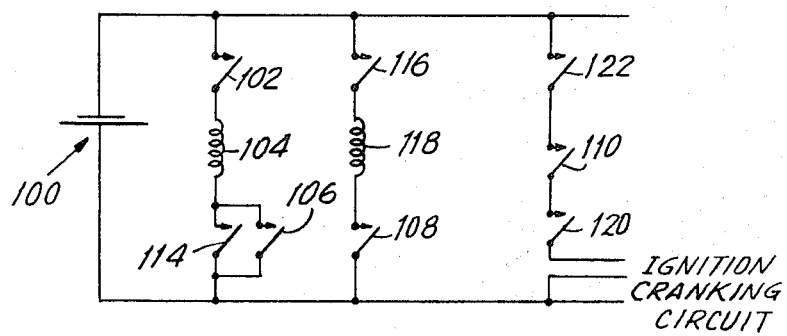
FIG. 4 is a simplified schematic illustration of a portion of an interlock circuit.

In FIG. 4 of the drawings a portion of the circuit for the interlock system on a passenger motor vehicle is shown. A battery 100 is provided and is connected to a normally open load sensitive switch 102 which is located in the outboard passenger portion of front seat 10. Switch 102 is closed when an outboard passenger on front seat 10 sits on the outboard passenger side of said front seat. Switch 102 is connected to a relay 104 which when energized closes normally open switches 106, 108 and 110. Relay 104 is connected to battery 100 by normally closed switch 114. Normally open switch 106 is in parallel with normally closed switch 114. Battery 100 is in series with switch 116 which is closed when the extendable seat belt of the seat belt assembly for the front seat outboard passenger is extended. Connected to switch 116 and switch 108 is a relay 118. Relay 118 when energized causes normally closed switch 114 to open and normally open switch 120 to close. Switch 108 is connected to battery 100.

The ignition starting switch 122 is connected to battery 100 and to switch 110. In addition, switch 110 is connected to switch 120 with switch 120 and the battery connected to the engine cranking circuit.

It is to be appreciated that the engine cranking circuit is not closed unless the driver extends the extendable belt of the seat belt assembly.

The cranking circuit is not closed if a passenger is sitting on the outboard passenger portion of the front seat unless seat switch 102 is first closed by the outboard passenger and then the extendable belt of the outboard passenger seat belt assembly is extended so that switch 116 is closed. If the foregoing sequence of closing of switches 102 and 116 is not followed, switches 110 and 120 are not closed so that engine cranking can not commence. After the motor vehicle engine is shut off the same sequence must be followed to start the engine.

It thus will be seen that there is provided an apparatus for transporting articles in the space above the passenger side of the front seat of a motor vehicle which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. Apparatus for carrying articles in the space above the outboard passenger side of a motor vehicle front seat on a motor vehicle having an interlock system which requires an outboard passenger to first sit on the outboard portion of the front seat and then extend the extendable belt of the front seat outboard passenger seat belt assembly in order to be able to start the motor vehicle comprising a motor vehicle front seat, a seat back for said front seat, a crevice located between said seat back and said front seat, a substantially planar article carrying means, said article carrying means having a rear portion and a forward portion, said rear portion of said article carrying means extending into said crevice at the outboard passenger portion of said front seat and front seat back, means extending upwardly from the upper portion of the outboard passenger portion of said seat back and providing a restraint for the head of a front seat outboard passenger, an elongated non-elastic limp means connected to said article carrying means forward of said rear portion thereof and said elongated non-elastic limp means also engaging said means for restraining the front seat outboard passenger's head whereby said article carrying means is supported by said elongated non-elastic limp means and said rear portion extending into said crevice so that the forward portion of said article carrying means is elevated above the outboard passenger portion of the front seat and articles can be transported in the space above the outboard passenger portion of a motor vehicle front seat without affecting the operation of any switches that are located in the outboard passenger portion of the motor vehicle front seat.

2. Apparatus according to claim 1 wherein a loop is formed by said elongated non-elastic limp means with a portion of said loop securing said article carrying means.

3. Apparatus according to claim 2 wherein means is provided for adjusting the size of said loop.

4. Apparatus according to claim 1 wherein said article carrying means is an element, said element including a rear portion which extends into said crevice, said element including a forward portion which extends past said front seat, and said elongated non-plastic limp means securing said element so that the forward portion thereof is elevated above the outboard passenger portion of the front seat.

5. Apparatus according to claim 4 wherein said element includes a curved forward portion, said curved forward portion extending in a downward direction.

6. Apparatus according to claim 4 wherein said element rear portion extends in an upward direction.

7. Apparatus according to claim 4 wherein said element includes a first slot and a second slot adjacent said curved section, said elongated non-elastic limp means defining a loop, said elongated non-elastic limp means extending through said first and second slots and about said means for restraining the passenger's head.

8. Apparatus for carrying articles in the space above the outboard passenger side of a motor vehicle front seat on a motor vehicle having a switch in the outboard passenger portion of the motor vehicle front seat comprising a motor vehicle front seat, a seat back for said front seat, a crevice located between said seat back and said front seat, a substantially planar article carrying means, said article carrying means having a rear portion and a forward portion, said rear portion of said article carrying means extending into said crevice at the outboard passenger portion of said front seat and front seat back, means extending upwardly from the upper portion of the outboard passenger portion of said seat back and providing a restraint for the head of a front seat outboard passenger, an elongated non-elastic limp means connected to said article carrying means forward of said rear portion thereof and said elongated non-elastic limp means also engaging said means for restraining the front seat outboard passenger's head whereby said article carrying means is supported by said elongated non-elastic limp means and said rear portion extending into said crevice so that the forward portion of said article carrying means is elevated above the outboard passenger portion of the front seat and articles can be transported in the space above the outboard passenger portion of the switch that is lcoated in the outboard passenger portion of the motor vehicle front seat.

* * * * *